Sept. 25, 1934.  L. VERD  1,974,787
METHOD AND APPARATUS FOR SEPARATING BOUND BOOKS
Filed May 2, 1932  5 Sheets-Sheet 1
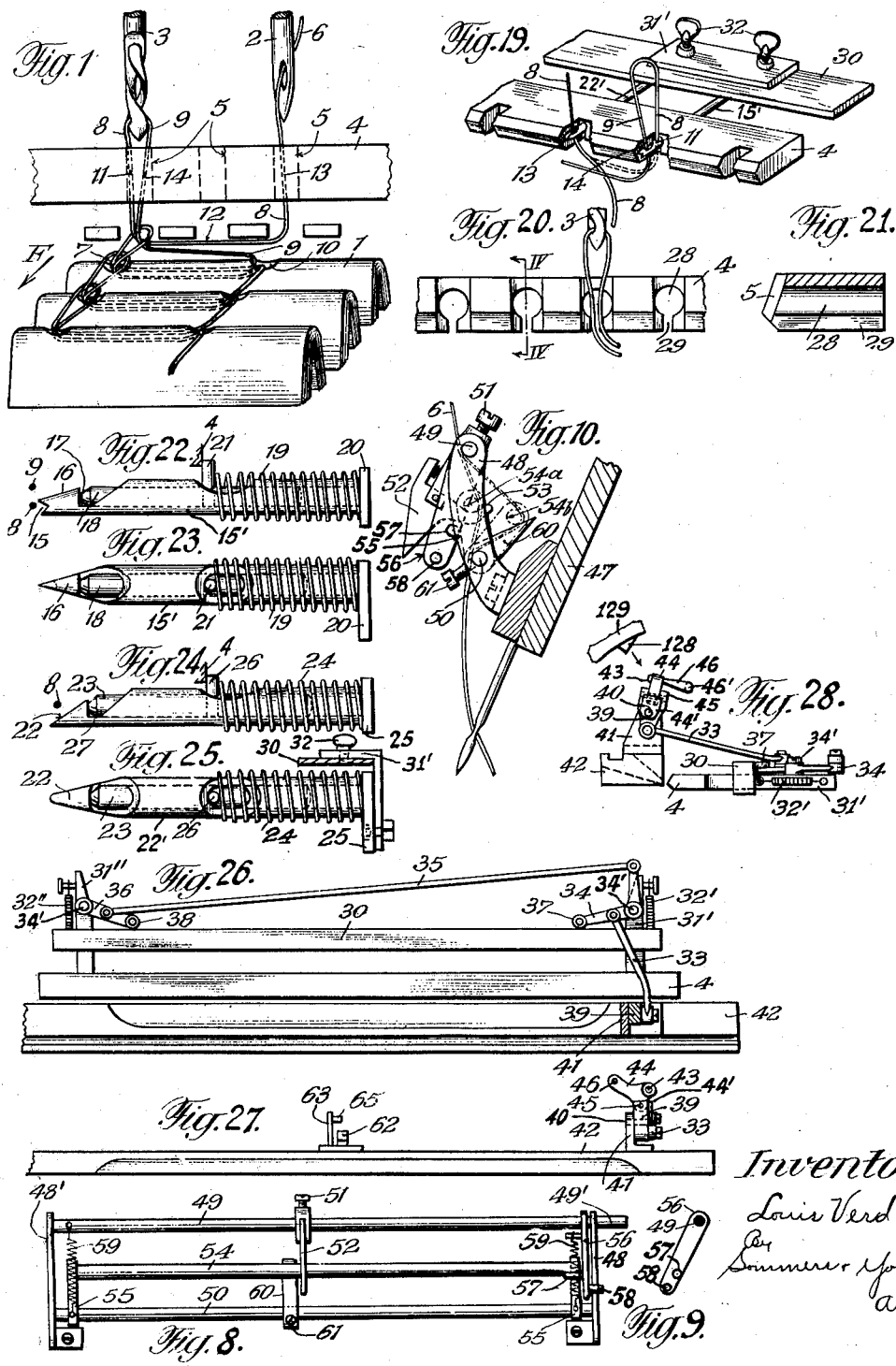

Sept. 25, 1934.    L. VERD    1,974,787
METHOD AND APPARATUS FOR SEPARATING BOUND BOOKS
Filed May 2, 1932    5 Sheets-Sheet 2
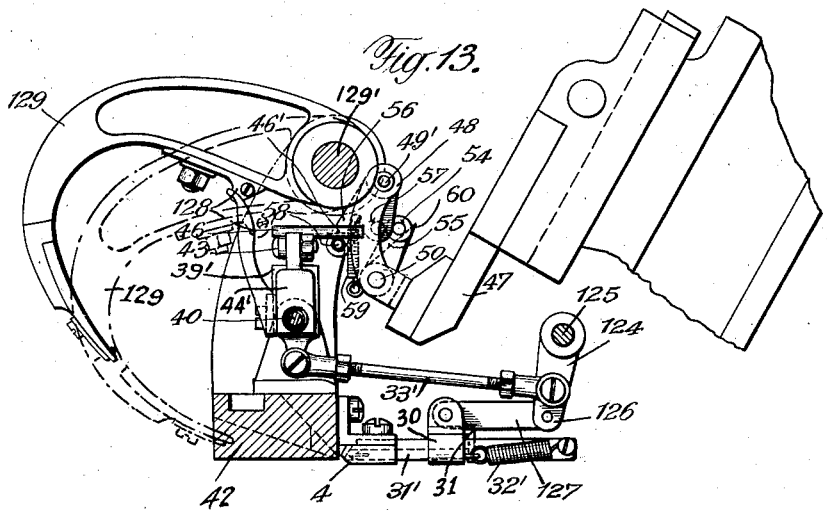

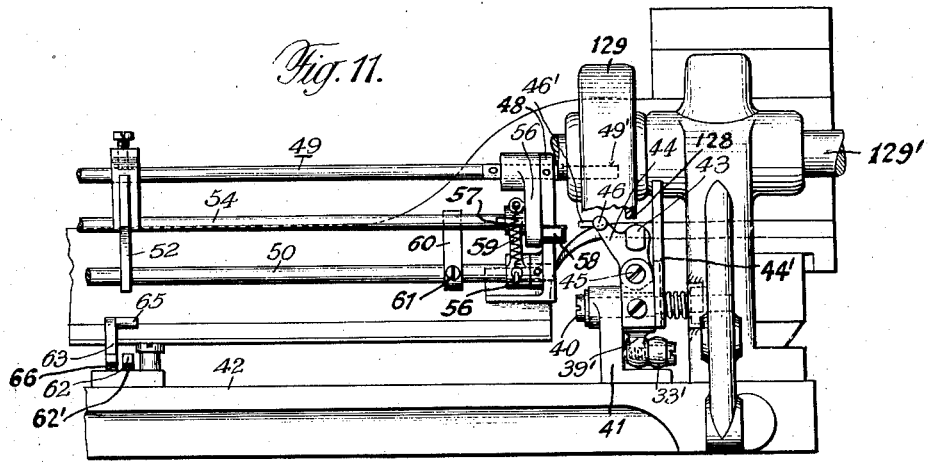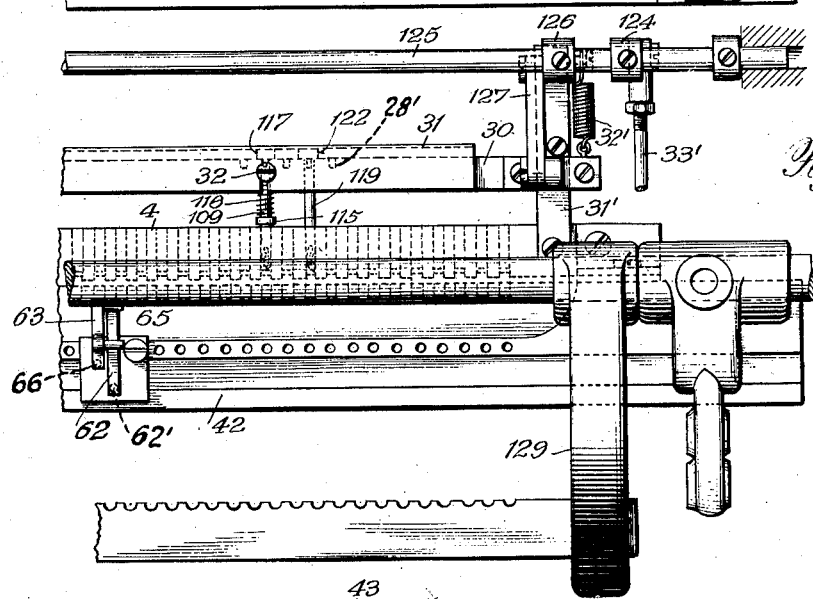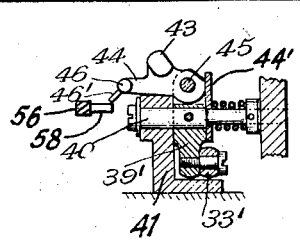

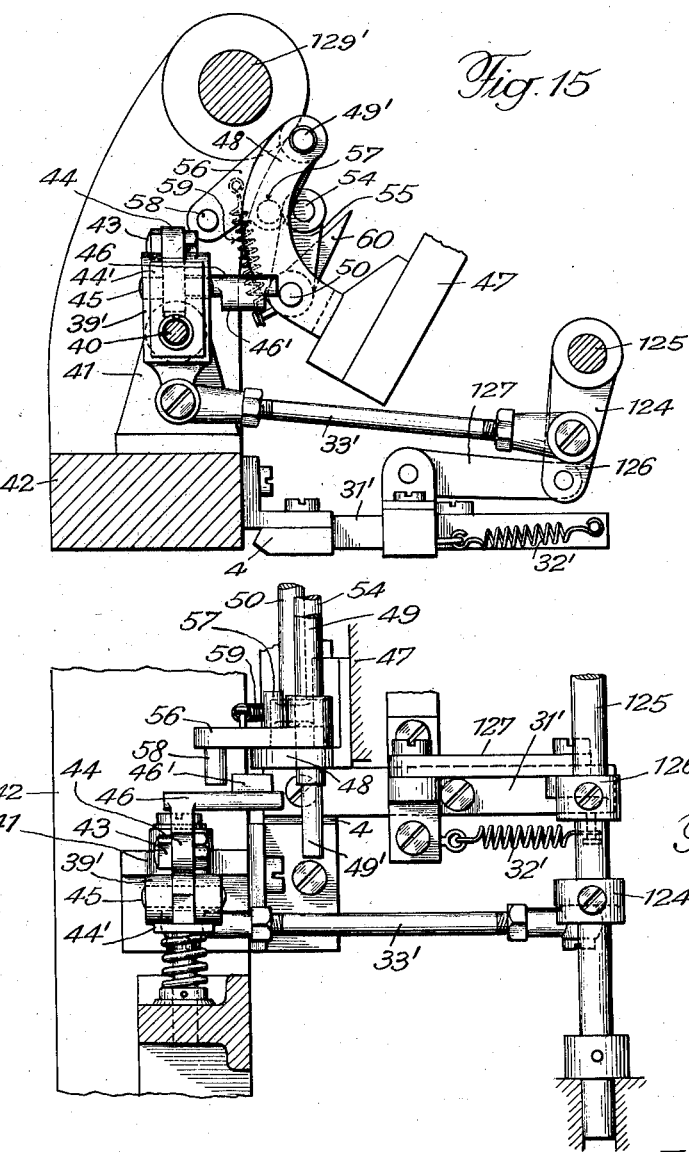

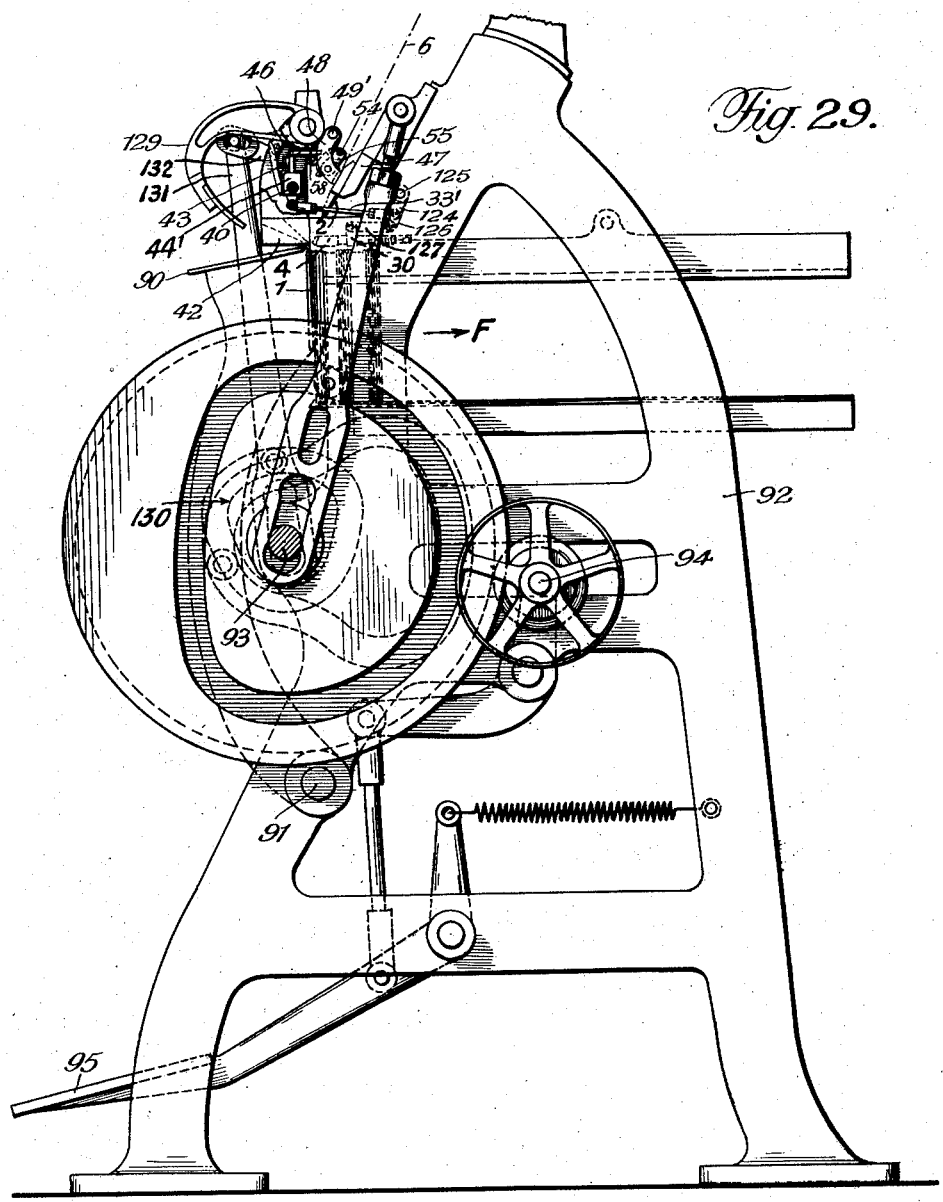

Patented Sept. 25, 1934

1,974,787

UNITED STATES PATENT OFFICE 1,974,787

METHOD AND APPARATUS FOR SEPARATING BOUND BOOKS

Louis Verd, Paris, France, assignor to the firm Martini Buchbindereimaschinenfabrik A.-G., Frauenfeld, Switzerland Application May 2, 1932, Serial No. 608,792
In France May 7, 1931

13 Claims. (Cl. 112—21)

This invention relates to methods of automatically separating bound stitched books and to book stitching machines for carrying out the method.

In the method according to the invention the stitching thread is cut at the loop formed at the barbed needle during effecting a blank stitch and held during and after the cutting by clamping action. In this manner unstitching of the chain stitches of the seam and angling of the stitching thread are avoided. Furthermore, this method enables effectively tighting the suture, so that the method is not restricted to plain sutures carried out with a linen thread, but applicable also for effecting seams on ribbons and canvas.

Preferably the portion of the stitching thread passing from eye-pointed needle to the barbed needle is severed and clampingly held underneath the eye-pointed needle, whereby this needle is prevented from being deprived of thread.

Alternatively, the portion of the stitching thread passing from the barbed needle to the last portion of the suture may be clampingly held.

With the book stitching machine for carrying out the method, according to the invention, cutting and clamping means are secured to a common carrier which is displaceable transversely of a traverse for guiding the eye-pointed needles and the barbed needles, so that the cutting and clamping means, during effecting the blank stitch, are adapted to be moved into a position in which they cut and clampingly hold the stitching thread respectively.

In the accompanying drawings a constructional form of a machine for carrying out the method according to the present invention is illustrated by way of example only, in which Fig. 1 is a schematical perspective view, as seen in the opposite direction to arrow F in Fig. 29, of a sewed portion after a blank stitch has been performed, inclusive of an eye-pointed and a barbed needle and of a traverse for guiding the working needles as well as cutting and clamping means for the thread;

Fig. 2 shows a sectional elevation of a cutting device in connection with its carrier and the guide traverse;

Fig. 3 is a plan view of the forward end of the cutting device;

Fig. 4 is a sectional elevation of a clamping appliance in connection with the carrier and the guide traverse illustrated in Fig. 2;

Fig. 5 is a plan view of the front end of this appliance;

Fig. 6 is a view similar to Fig. 5 with parts in different positions;

Fig. 7 is a bottom view of Fig. 5.

Fig. 8 illustrates a front view of a releasing device arranged on a common carrier for the eye-pointed-needles and the barbed needles, Fig. 9 is a side elevation of a detail of Fig. 8;

Fig. 10 is a sectional side elevation of the needle carrier and associated parts;

Fig. 11 shows an elevation of a part of the book stitching machine,

Fig. 12 is a plan view of Fig. 11, and

Fig. 13 a corresponding sectional side elevation.

Fig. 14 is a part-section of Fig. 11 with the individual parts in different positions, Fig. 15 shows a side elevation similar to Fig. 13 with certain parts in different positions during effecting a normal stitch;

Fig. 16 is a plan view of Fig. 14;

Figs. 17 and 18 illustrate the lowermost positions of the needle carrier during effecting a normal and a blank stitch.

Fig. 19 shows a perspective view, as seen from the front side of the machine, of a carrier for modified cutting and clamping means and of the traverse for guiding the eye-pointed and the barbed needles;

Fig. 20 is an elevation of the guide-traverse;

Fig. 21 shows a section on the line IV—IV in Fig. 20;

Fig. 22 illustrates a plan view of a modified cutting and clamping means;

Fig. 23 is an elevation of Fig. 22;

Fig. 24 is a plan view of a modified clamping appliance;

Fig. 25 is an elevation of Fig. 24;

Fig. 26 shows a plan view of a modified drive for the cutting and clamping means;

Fig. 27 is an elevation of Fig. 26;

Fig. 28 a corresponding side elevation, and

Fig. 29 is a side view of the machine showing the general disposition of the parts with which this invention is particularly concerned.

Referring to the drawings, Fig. 1 shows schematically a view of a sewed portion after a blank stitch has been performed, i. e. after a stitch is effected without that previously a booklet or a sheet respectively was placed on the table. The arrows F in Figs. 1 and 29 indicate the direction in which the booklets travel to the rear part of the machine. 1 denotes the last booklet of a just finished volume, 2 an eye-pointed needle and 3 a barbed needle. These eye-pointed and barbed needles are guided by a traverse 4, which is hereinafter called cross guide for the eye-pointed and barbed needles or working needles, and which is formed with regularly spaced apertures 5 for the passage of the working needles. 6 designates the sewing thread which after the performance of a blank stitch assumes the position shown in Fig. 1. After the said blank stitch has been performed, fresh booklets are placed on the table 90 in gradual succession, for the purpose of stitching the next following volume. The work or stitching table 90 (Fig. 29) is mounted at 91 to rock between the machine side shields 92 by action of cam means arranged on the drive shaft 93 in an equivalent manner as described in the U. S. specification No. 936,643 relating to a book stitching machine of which the machine according to the present invention is an improvement. 94 denotes a jack shaft provided with a belt pulley and adapted to be operatively connected with the shaft 93, by means of a foot lever 95, through the intermediary of a friction drive. In order to subsequently separate the volumes, it is necessary to cut the blank stitch, which was obtained during an inoperative interval, at a suitable point. For avoiding that the sheets forming a volume disunite by the chain stitch 7 getting loose, the thread portion designated by 8 in Fig. 1, which runs from the barbed needle to the eye-pointed needle must be severed, and not the thread portion designated by 9 which extends from point 10 of the booklet 1 to the barbed needle 3 and holds the chain stitch.

In the method according to the present invention the thread portion 8 is preferably cut at 11, i. e. above the chain stitch 7, as soon as the cross carrier 47 (Fig. 29) for the eye-pointed and barbed needles begins to rise. This has certain advantages over the method in which the thread portion 8 is severed at a point indicated at 12 which lies below tongue-shaped cross members, as provided in certain machines and indicated in Fig. 1, and thus below the chain stitch 7. In fact the method according to the invention is not only applicable to plain seams carried out with linen thread, but also to seams or sutures performed on a ribbon or on canvas, which were impossible if the thread had been cut for example at 12. Moreover, by means of the method according to the invention, a complete separation of the volumes is obtained since the threads are not tangled at the chain stitches which is the case when the thread is cut at 12. In the latter event an intermediate manual operation is required which, according to the invention, is dispensed with. Again, the necessity of separating the thread portion 8 from the thread portion 9, in order to be able to cut the portion 8 at 12, is no longer existing, the point 11 at which the portion 8 is severed being situated at a place where the thread portions 8 and 9 are naturally prone to separate.

When, in the method, according to the invention, it is desired to avoid that the thread needle 2 is not accidentally deprived of thread after the thread is cut at 11, the portion 8 thereof is clamped for example at 13, where the eye-pointed needle 2 is bound to pass by, and maintained in clamped condition for a length of time allowing for a certain number of stitches to be performed.

Alternatively, the thread portion 9 may be clampingly held during a certain time at 14, whereby tightening of the suture is obtained and the tendency of the last booklets of a book to disunite, after the thread portion 8 has been cut, is avoided. This result was not obtainable by means of the prior methods with provisions for automatically cutting the thread.

For carrying out the method, according to the present invention, advantageously the hereinafter explicitly described mechanical means are employed.

For effecting the cutting of the thread portion 8 at 11 (Fig. 1) a device may be used as shown in the Figs. 2 and 3. This cutting device comprises a plunger 119 which is provided at the front end with a hook 120 having an inner cutting edge 121. To the rear end of the plunger a connecting member 122 is fastened on which a pin 123, fitting in bores 28' of a beam support 30 extending across the machine behind the work table 90 (Fig. 29) is fixed.

For simultaneously clamping the thread portion 8 at 13 (Fig. 1) a device may be employed as shown in the Figs. 4 to 7.

With this construction a tube 109 is provided the front end of which has a central incision (Fig. 5) by which two opposite pointed portions 110 and 111 are formed for catching the thread between them during the forward movement of the clamping appliance in the direction of the arrow in Figs. 4 to 6. On one side of the incision a hook 112 is arranged behind which the thread can slidingly engage by virtue of the guidance afforded to it by the lower edge of the pointed portion 110 (Fig. 6). A plunger pin 113 displaceably arranged in the tube 109 is connected to an exterior ring slidably arranged on the tube with the aid of longitudinal slots 114 in the tube. The ring 115 and the plunger pin 113 are pushed forwardly by a spring 116 which is inserted between the ring 115 and a connecting number 117 for the appliance which is provided with a pin 118 fitting in bores of the beam support 30.

In order to provide passageway for the cutting device and for the clamping appliance, the cross guide 4 for the working needles is laterally transversely bored at the places 5 where it is apertured for guiding the eye-pointed and the barbed needles respectively. The cross bores 28 are slitted at 29 on their underside for providing passage and displacement for the clamped thread, when the machine operates in normal manner, after a blank stitch has been performed, for stitching fresh books, whereby the booklets are forwarded in the direction of the arrows F shown in the Figs. 1 and 29. Owing to the fact that a certain number of apertures 28 are provided a regular distance apart in the cross guide 4 and a corresponding number of bores 28' in the cross support 30 which is located behind the guide 4, the cutting and clamping means can be arranged at any suitable place on the length of this guide and the support 30 (Fig. 12). For advancing the cutting and clamping means in the guide 4 these means are connected to the support 30 by inserting the pins 118 and 123 in proper bores 28' in the latter and fastening a check rail 31 for example by means of screws 32 (Figs. 2 and 4) to the support 30.

During this advance movement of the clamping appliance the ring 115 hits the cross guide 4, whereafter it remains in this position for holding the plunger pin 113 back in the tube 109 while the latter keeps on advancing for catching the thread portion 8 in the manner hereinbefore described. During the backward movement of the clamping appliance, the thread is clamped to the hook 112 by the spring 116 acting on the slanting forward end of the plunger pin 113 (Fig. 7) after the tube 109 is so far retracted that the ring 115 is moved out of engagement with the guide 4 again. By adjustment of the force exerted by the spring 116, the time interval is regulatable at which the thread is automatically released from the hook 112 again during the subsequent normal stitching operation of the machine. While the cross support 30 moves backwardly also the cutting device is rendered operative for severing the clamped thread portion 8 by the cutting edge 121 after the thread was caught by the hook 120.

In the following the driving device for the cross support 30 will be described. This support is arranged to slide longitudinally of two lateral guide bars 31' (Figs. 12, 13, 15 and 16) and is constantly pulled backwards by retractile springs 32' adjacent the bars 31'. On the other hand the cross support 30 is pushed forwardly against the tension of the springs 32' by a connecting rod 33'.

The connecting rod 33' is linked to a lever arm 124 which is secured to a rock shaft 125. On either side of this shaft 125 a crank arm 126 is secured (Figs. 12 and 16), to each of which a link 127 is pivotally connected, the other end of which is linked to the beam support 30, so that on displacing the connecting rod 33' the beam support is shifted in parallel disposition to the cross guide 4.

The connecting rod 33' is pivotally connected to a block 39' which is adapted for turning about a pivot pin 40 in a plane transversely disposed to the work table of the machine. In the Figs. 26 to 28, the rod 33 is alternatively shown to be linked, by means of a bell crank lever 34, to a connecting rod 35 which in turn is linked to a lever arm 36. The lever 34 and the lever arm 36 are movable about pivots 34' fastened to the guide bars 31', 31'' and may be provided at their ends with rollers 37 and 38 respectively which bear on the beam support and displace the same in parallel disposition, on actuation of the connecting rod 33. The pivot pin 40 is arranged on a mounting member 41 secured to a cross guide bar 42, extending above the work table 90 (Fig. 29), and the block 39 is rotationally displaced by cooperation of a nose 128 on a sheet gripper arm 129 with a control member in the form of a projection 43 on the blocks 39, 39' (Figs. 11 and 28). The sheet gripper arm is operatively connected with the shaft 93 by means of cam 130, slotted link 131 and slotted arm 132 for periodical rocking about its pivot 129' in timed relation with this carrier. In order to permit engagement of the sheet gripper arm 129 with the projection 43, it is necessary that the latter enters on the path of the nose 128 (Fig. 11). Normally the projection 43 is out of range of this nose, the blocks 39, 39' respectively the connecting rods 33, 33' respectively and the cross support 30 thus not being adapted to be actuated, so that the latter together with the cutting and clamping means remain in their rearward positions. During formation of a blank stitch, however, the projection 43 is moved in the path of the sheet gripper arm 129 by means of a device which is hereinafter described. By cooperation of the parts 43 and 129 the blocks 39, 39' respectively, the connecting rods 33, 33' respectively and the cross support 30 are displaced, so that the cutting and clamping means are moved forwardly to perform the previously described operations.

The upper part 44 of the blocks 39, 39' respectively, that is, the part carrying the projection 43, is rockable in the longitudinal direction of the work table of the machine, i. e. in the transverse direction of the machine, (Figs. 11 and 27) about a pivot 45, and carries to the left, when viewed in these figures, a bolt 46 which is adapted for cooperation with the following device.

The cross carrier 47 carrying the working needles is equipped with two lateral carrier arms 48, 48' (Figs. 8, 10) on which two shafts 49 and 50 are fixed.

The shaft 49 is prolonged towards the right at 49' (Figs. 8, 11) for permitting this shaft to act on the bolt 46 and to normally push said bolt downwardly in order to retract the projection 43 into inoperative position (Fig. 14), after the bolt 46, during effecting a blank stitch, was raised and the control member 43 moved in the path of the sheet gripper arm. To the shaft 49 a tappet 52 is secured, for example, by means of a screw 51 in a mounting member 51' for the tappet and the latter is provided with a hook-shaped projection 53 for engagement with a bar 54 which is secured to carrier arms 55 rotatably arranged on the axle 50 (Figs. 8, 13, 15, 17, 18).

On the shaft 49 an arm 56 is rotatably mounted (Figs. 8, 11, 13, 15) which on one side carries a stop pin 57 for cooperation with the respective arm 55 and on the other side a stud 58 which in a certain position (occupied by this stud during the formation of a blank stitch) cooperates with the bolt 46, by engaging a stud 46' on the same (Figs. 11, 14, 16), when the cross carrier 47 for the working needles moves upwardly.

During the normal stitching operation the bar 54 is held in the hook 53 of the tappet 52, so that the stud 58, when moving together with the cross-carrier 47 for the working needles, is prevented from engaging with the stud 46' on the bolt 46. But, when the tappet 52 is upwardly rocked, for example by a feeler member, in a manner hereinafter described, the bar 54 is moved out of engagement with the hook 53, thus adapting it to fall backward by action of its own weight, which movement may be promoted by cooperation of tension springs 59 inserted between the arms 55 and 56 (Figs. 8, 11, 13, 15). A limit stop is provided for this movement, for instance in the form of an abutment member 60 secured to the axle 50 by a screw 61. In Fig. 10 the normal position of the bar 54 is indicated at 54a, and at 54b the position of the bar is shown after its release by the hook 53, in consequence of the tappet 52 being upwardly rocked (Fig. 18). When the bar 54 swings backwardly, the arm 55 cooperating with the stop pin 57 swings backwardly together with it and therefore also the arm 56 and the stud 58. The latter then takes up a position adapting it to act on the stud 46' at the moment the cross carrier for the working needles begins to rise. Incidental to the bolt 46 moving upwardly the portion 44 on the block 39, 39' respectively is turned to the right (when looking at the Fig. 14), in which position the portion 44 is arrested by a spring pressed plate 44' (Figs. 11 and 27) similarly as in the lower position (Fig. 14), the plate 44' engaging with suitable shoulders on the portion 44. The control member 43 thus being moved in the path of the sheet gripper arm 129, i. e. the nose 128 on the same, the cross support is operated as previously explained.

Consequently, when during the performance of a blank stitch, the tappet 52 is rocked outwardly (Fig. 18) the cutting and clamping means on the cross support 30 are advanced. This is accomplished through the intermediary of the sheet feeler member 62 of known construction (Figs. 17, 18) which can be arranged on the guide bar 42 in association with a bell crank lever 63 which is rotatable about a pivot 64, and carries on its upper end a finger 65 which normally, i. e. when a booklet is placed on the table (Fig. 17), assumes a position exteriorly of the path of the tappet 52. In the absence of a booklet lying on the table, however, (Fig. 18), the end of the sheet feeler member 62 drops entirely into a recess of the table by action of its own weight and that of spring 62', thus swinging outwardly. At the same time the lever 63 turns inwardly with its finger 65 entering on the path of the tappet 52 the lever being connected to the feeler 62 by a spacer spring 66. It will be seen that as aforesaid these movements can only take place, when the table is bare of booklets, i. e. when a blank stitch is to be performed.

In this way the tappet 52 is outwardly rocked by the finger 65 during the downward movement of the cross carrier 47 for the needles (Fig 18), whereby the aforesaid movements, as the raising of the bolt 46 during the upward movement of the cross carrier for the working needles and the displacement of the control member 43 into the path of the nose on the sheet gripper arm are initiated. On the rising movement of the cross carrier for the working needles and the separating movement of the table from the booklets continuing, the sheet gripper arm is further advanced, thus hitting the control member 43, whereby as explained above, the advance movement of the cutting and clamping means is initiated. In this manner the thread portion 8 is severed and immediately clamped in position. Or on the completion of the blank stitch the thread portion 9 may be clampingly held.

For effecting the cutting of the thread portion 8 at 11 and the clamping of the thread portion 9 at 14 a single device is used, for example combined cutting and clamping means, as illustrated in the Figs. 22 and 23, which is connected to the cross support 30. This device is constituted by a part 15' provided with a bored portion and formed at 15 with a concave cutting portion. The thread portion 8 enters in this concave portion, when the cutting and clamping device incidental to the performance of the blank stitch is advanced. In this way the thread portion 8 is cut. The said device is provided on one side with a rearwardly ascending surface 16 for guiding the thread portion 9 towards an incision 17. In this bore of the cutting and clamping device a small plunger pin 18, influenced by a spring 19 is displaceably arranged. The spring 19 is inserted between a connecting member 20 for the device and a projection 21 which during the advance movement of the cutting and clamping device, hits a stationary part of the machine, thus holding the small plunger pin 18 back, so that the thread portion 9 after passing the surface 16 is caused to enter the incision 17. Thereafter the thread portion 9 is clamped by the plunger pin 18, during the return movement of the device, to be maintained in clamped condition in the incision 17 as long as no sufficiently great tension effect is exerted thereon to induce said thread portion to recede from the incision. It is obvious that by correspondingly adjusting the force exerted by the spring 19 the time moment at which the thread portion 9 is adapted to be retracted from the incision 17 by action of the thread tension is regulatable.

The form of the cutting member 15 of the cutting and clamping device, may be modified to adapt it to work, for example in such a manner, that the thread portion 8, instead of being severed during the advance movement of the cutting and clamping device, is cut during the rearward movement thereof. This modification is shown in Figs. 26 and 27 of the drawings.

The thread portion 8, after being severed at 11 (Fig. 1), may also be clamped at 13 by means of a clamping appliance of similar construction as the just described cutting and clamping device, but without a cutting portion. A clamping appliance of this kind is represented in the Figs. 24 and 25 to be constituted by a part 22' comprising a bored portion with one end in the form of a slanting surface 22. In the bore of said portion a plunger pin 23 is displaceably arranged which normally assumes a forward position by action of a spring 24. This spring 24 is arranged between a connecting member 25 for the appliance and a projection 26 rigid with the plunger pin and adapted to strike a stationary part of the machine on the clamping appliance moving forwardly. During this forward movement of the thread clamping appliance the thread portion 8 drops into the incision 27 and is subsequently pressed against a shoulder of the appliance by action of the plunger pin 23, said pin being again pressed forwardly by the spring 24, when the clamping device moves backwardly. The connection of the last described cutting and clamping means may be effected as shown in the Figs. 19 and 25 by means of a common yoke 31' for a small number of these means which is clamped to the support 30 by a pair of thumb screws 32.

The clamping effect of the springs 19 and 24 must be less than the strength of the thread, as otherwise the thread is torn when it is retracted from the incisions 17, 27 respectively against the action of these springs.

When after the completion of the blank stitch the next following normal stitch is to be performed and for this purpose the cross carrier for the working needles moves downward, the extension 49' of the shaft 49 pushes the bolt 46 downwardly, thereby rendering the control member 43 ineffective by moving it out of the path of the sheet gripper arm. On the other hand, due to the sheet feeler member reassuming its position in which the finger 65 is moved beyond the path of travel of the tappet 52, the latter is not displaced, and the bar 54 left to remain in engagement with the hook 53.

It will be noted that during formation of the normal stitch next following the blank stitch the bar 54 reassumes its position 54a in the hook 53, in consequence of the thread portion 6 being tensioned, as will be hereinafter described.

The bar 54 actually not only serves for releasing the cutting and clamping means, but also for advancing the supply thread. During effecting the blank stitch it is necessary to provide a small excess of thread at the eye-pointed needle. The thread portion 6 passes behind the bar 54. Thus, when the latter is released from the hook 53 by action of the finger 65 of the lever 63 associated with the sheet feeler member, the thread is brought on, whereafter a loop is formed, as shown in chain dotted lines in the Figs. 10 and 18.

Thus owing to the fact that the thread 6 is passed behind the bar 54, the latter reassumes its position in the hook 53 by action of the thread tension. In order to permit moving the bar 54 back into position by the thread the springs 59 must not be too strong.

I claim:

1. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, cutting and clamping devices for the stitching thread, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

2. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, a cutting device for the stitching thread, a cutting edge provided on the end of said cutting device adjacent to said stitching table and adapted for gripping and cutting the stitching thread on advancing of the cutting device towards the table, a clamping device for the stitching thread, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

3. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, a cutting device for the stitching thread, a hook provided with a cutting edge on the end of said cutting device adjacent to said stitching table and adapted for gripping the stitching thread on advancing of the cutting device towards the table and for cutting the thread by said cutting edge on receding of the cutting device from the table, a clamping device for the stitching thread, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

4. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, a cutting device and a clamping device for the stitching thread, an incision provided at the end of said clamping device adjacent to said stitching table and adapted to receive the stitching thread, a plunger pin cooperating with said incision for clampingly holding the thread therein, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

5. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, a cutting device and a clamping device for the stitching thread, an incision provided at the end of said clamping device adjacent to said stitching table and adapted to receive the stitching thread, a plunger pin cooperative with said incision for clampingly holding the thread therein, a spring pushing said plunger pin in the direction towards said table, a projection on said plunger pin and adapted to strike a stationary part of the machine on advancing of the clamping device towards the table for arresting the plunger pin, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

6. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, a cutting device and a clamping device for the stitching thread, a guide surface for the stitching thread upwardly inclined from the end of said clamping device adjacent to said stitching table, a transverse incision provided at the inner end of said guide surface, a plunger pin cooperating with said incision for clampingly holding the thread therein, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

7. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, a cutting device and a clamping device for the stitching thread, a tubular body for said clamping device, a longitudinal incision tapering in a point provided in the end of said tubular body adjacent to said stitching table for the thread, a hook formed in said incision for catching said stitching thread, a plunger pin guided in said tubular member for cooperation with said hook for clamping the stitching thread, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

8. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, cutting and clamping devices for the stitching thread combined in a common assembly, a cutting member provided on said cutting and clamping devices in the end thereof adjacent to said stitching table, a guide surface for the stitching thread upwardly inclined from said end of said devices, a transverse incision provided at the inner end of said guide surface, a plunger pin cooperating with said incision for clampingly holding the thread therein, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

9. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, cutting and clamping devices for the stitching thread, said devices passing through said cross guide for the working needles transversely of said needles in bores of the guide that are slitted on their underside as regards the on moving needles and adapted for passing the stitching thread, a common cross support for said cutting and clamping devices and adapted to move towards and away from said cross guide for the working needles, actuating means for said cross support for said cutting and clamping devices and operatively connected with said cross carrier for the working needles, and sheet feeler means cooperating with said actuating means for automatically starting said cutting and clamping devices moving into position for cutting and clamping the stitching thread on the absence of a sheet on said stitching table and while said working needles are performing a blank stitch.

10. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, cutting and clamping devices for the stitching thread, a common cross support for said cutting and clamping devices and adapted to move towards and away from said cross guide for the working needles, a linkage inserted between said cross carrier for the working needles and said cross support for said cutting and clamping devices, a control member for said linkage, sheet feeler means cooperating with said control member for automatically starting said cutting and clamping devices moving into position for cutting and clamping the stitching thread on the absence of a sheet on said stitching table, and a sheet gripper arm operatively connected with said cross carrier for the working needles and adapted to cooperate with said control member on the operation of said sheet feeler means.

11. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, cutting and clamping devices for the stitching thread, a common cross support for said cutting and clamping devices and adapted to move towards and away from said cross guide for the working needles, a linkage inserted between said cross carrier for the working needles and said cross support for said cutting and clamping devices, a control member for said linkage, a releasing device for said control member, sheet feeler means cooperating with said control member for automatically starting said cutting and clamping devices moving into position for cutting and clamping the stitching thread on the absence of a sheet on said stitching table, and a sheet gripper arm operatively connected with said cross carrier for the working needles and adapted to cooperate with said control member when on the operation of said sheet feeler mechanism said control member is moved in the path of said sheet gripper arm by means of said releasing device.

12. In a book stitching machine of the type described, in combination, a stitching table mounted to rock longitudinally of the machine for successively bringing the sheets to be stitched in working position, a reciprocating cross carrier for the working needles in the form of cooperative eye-provided and hooked needles and operatively connected with said stitching table, a cross guide for the working needles, a cutting and a clamping device for the stitching thread, a common cross support for said cutting and clamping devices and adapted to move towards and away from said cross guide for the working needles, a linkage inserted between said cross carrier for the working needles and said cross support for said cutting and clamping devices, a control member for said linkage, a releasing device for said control member, a shaft included in said releasing device in front of the portion of the stitching thread passing to the eye-provided needle, means included in said releasing device for moving said shaft rearwardly and adapting said shaft to bring on an excess of thread to said eye-provided needle, sheet feeler means cooperating with said control member for automatically starting said cutting and clamping devices moving into position for cutting and clamping the stitching thread on the absence of a sheet on said stitching table and a sheet gripper arm operatively connected with said cross carrier for the working needles and adapted to cooperate with said control member when on the operation of said sheet feeler mechanism said control member is moved in the path of said sheet gripper arm by means of said shaft in said releasing device moving rearwardly.

13. In a book stitching machine of the type described, in combination, a stitching table mounted to rock longitudinally of the machine for successively bringing the sheets to be stitched in working position, a reciprocating cross carrier for the working needles and operatively connected with said stitching table, a cross guide for the working needles, cutting and clamping devices for the stitching thread, a common cross support for said cutting and clamping devices and adapted to move towards and away from said cross guide for the working needles, a linkage inserted between said cross carrier for the working needles and said cross support for said cutting and clamping devices, a control member for said linkage, a releasing device for said control member, a tappet included in said releasing device, a sheet feeler arm cooperating with said control member, a finger provided on said sheet feeler arm and adapted to cooperate with said tappet for automatically starting said cutting and clamping devices moving into position for cutting and clamping the stitching thread on the absence of a sheet on said stitching table and while said working needles are performing a blank stitch.

LOUIS VERD.